United States Patent [19]
Gent

[11] Patent Number: 5,878,695
[45] Date of Patent: Mar. 9, 1999

[54] EXTENDIBLE HOG GATE AND CONFINEMENT FACILITY GATE SYSTEM

[76] Inventor: John F. Gent, 1880 170th St., Wellman, Iowa 52356

[21] Appl. No.: 914,682

[22] Filed: Aug. 19, 1997

[51] Int. Cl.[6] ...................................................... A01K 1/00
[52] U.S. Cl. ............................................................. 119/503
[58] Field of Search ..................................... 119/436, 444, 119/452, 472, 473, 474, 498, 502, 503, 506, 522, 523, 524

[56] References Cited

U.S. PATENT DOCUMENTS

| | | |
|---|---|---|
| 479,680 | 7/1892 | Thompson . |
| 1,142,246 | 6/1915 | Gagan . |
| 2,491,577 | 12/1949 | Olinger . |
| 2,547,426 | 4/1951 | Youngman . |
| 2,714,367 | 8/1955 | Arnold . |
| 3,520,516 | 7/1970 | Webster . |
| 3,827,402 | 8/1974 | Laurenz . |
| 4,140,080 | 2/1979 | Snader ..................................... 119/473 |
| 4,148,277 | 4/1979 | Engle et al. . |
| 4,452,178 | 6/1984 | Nijhuis . |

FOREIGN PATENT DOCUMENTS 1166752  7/1985  U.S.S.R. ................................. 119/502

*Primary Examiner*—Thomas Price
*Attorney, Agent, or Firm*—Allan L. Harms

[57] ABSTRACT

An improved adjustable hog gate for use in forming pens is provided with a stationary section and an adjustable section which may be extended from, or retracted onto, the stationary section. The stationary section is bounded by an end plate which receives the lateral bars of the adjustable member while the adjustable section has an end plate which receives the lateral bars of the stationary member. The improved gate may be used in a confinement facility pen system which allows the central alley of the confinement facility which is defined between opposing series of pens to be adjustable in width. The alley may be expanded in width by urging each of the improved hog gates into a retracted position while animals are moved along the alley and then manually extending each of the invention gates to narrow the alley and provide a larger effective pen area for containment of hogs. An alternative embodiment provides a modification device for converting a fixed length hog gate to an adjustable hog gate.

18 Claims, 3 Drawing Sheets

5,878,695

EXTENDIBLE HOG GATE AND CONFINEMENT FACILITY GATE SYSTEM

CROSS REFERENCE TO CO-PENDING PROVISIONAL APPLICATION

This application is converted from copending provisional patent application entitled "Extendible Hog Gate and Confinement Facility Gate System", Ser. No. 60/036,247 filed Jan. 24, 1997.

BACKGROUND OF THE INVENTION

The present invention pertains to equipment used in the raising of swine in a confinement facility and particularly to the fencing or gates used to separate a confinement facility into pens.

In the present practice of commercial raising of hogs, large enclosed buildings are used to house the animals and to control the exposure of the animals to disease. The buildings are constructed with large open areas in which are placed pen units which typically comprise discrete fencing units called "gates" or "hog gates" arranged to form series of rectangular pens. The confinement buildings typically are rectangular enclosed units with centrally located doors on the opposing short ends of the building and with a central alley extending between the doors of the building, with the alley defined by walls of the pens.

The gates which comprise the walls of the pens which define the alley may be opened in a swinging fashion so that hogs may be driven to and from the pens and along the alley to one of the building's doors.

In order to maximize the usefulness of the hog confinement building, it is preferable to keep the central alley as narrow as possible, yet wide enough to allow persons to walk down the alley comfortably. However, when hogs are moved down the alley, difficulties arise in driving the hogs along the narrow alley. Using shorter pen walls extending from the outside walls of the building to the central alley reduces the space available to house hogs but allows a wider alley along which hogs may be more easily driven. A wider alley allows multiple hogs to walk side by side and eases the effort in keeping the hogs moving toward the door. In addition, a hog which reverses its direction on leaving a pen can be turned around easily, while a hog headed in the wrong direction up a narrow, two-foot alley does not have room to reverse direction and must be physically lifted on its hind legs and turned around.

SUMMARY OF THE INVENTION

The present invention solves the objective of maximizing floor space in the hog facility with the opposing objective of allowing a wide alley for the hogs to pass along.

An adjustable fencing unit for use in a hog confinement facility is disclosed. Such a fencing unit is frequently termed a "gate" or a "hog gate" and is used with other gate units to form rectangular pens within a hog confinement building used to complete the raising of hogs before they are transferred to the slaughtering facility. The gate is provided with a stationary member and an axially extending adjustable member. The stationary member of the gate is provided with a first end and a second end, each of the ends being provided with a vertical end plate. Horizontal transverse rods are mounted in parallel relation to the top rail of the gate and extend from its first end plate to its second end plate. The transverse rods are fixed at their opposing ends to the end plates. The first end plate of the stationary member is provided with typical mounting hardware as in prior art devices to allow it to be detachably secured to an axially extending adjacent gate or alternatively to be mounted detachably to a neighboring perpendicularly extending gate. The first end plate of the stationary section of the gate is provided with a plurality of rod receiving openings which are spaced to receive the transverse rods of the adjustable member of the invention gate.

The adjustable member is provided with a first end and a second end, each of which has a vertical end plate. The end plate of the second end of the adjustable member has openings in which the rods of the stationary member are received such that the end plate of the adjustable member may be slid along the rods of the stationary member and such that the rods of the adjustable member may slide through the receiving openings of the end plate of the first end of the stationary member. Each end plate of the stationary member is provided with a foot which supports the end of the stationary member. The adjustable member has a foot only at its first end. The feet may be selectively secured to the floor of the confinement building.

The invention gate is used as a lateral pen wall and extends toward a central alley from the outside wall of a hog confinement building. The first end of the adjustable member is provided with detachable mounting means to allow detachable mounting of prior art gate members which define the alley of the hog confinement facility. Because the adjustable member of the invention gate may be telescoped inwardly upon the stationary member, the alley of the facility may be selectively widened or narrowed by sliding all lateral gate walls. The end walls of the pens along the alley need not be disconnected from the end plates of the first ends of the adjustable members of the invention gates but are slid along the flooring of the facility as the adjustable members of the invention gates are telescoped toward the stationary members.

It is an object of the invention to provide a hog gate system for a confinement facility which permits maximum utilization of the floor space of the facility and allows simple modification to increase the width of the ingress and egress alley at times when hogs are to be moved into or out of the facility.

It is a further object of the invention to provide a gate system which improves the cost effectiveness of the hog confinement facility in which the gate system is used.

It is a further object of the invention to provide a gate which can be easily lengthened or shortened without the use of tools.

It is a further object of the invention to provide a livestock pen for a confinement facility which can be adjusted in length without disassembly of the sides of the pen.

It is a further object of the invention to provide an improved hog gate which can easily be adjusted without affecting the structural integrity of the pen of which the gate is a part.

These and other objects of the invention will be apparent from review of the following description of the invention.

DESCRIPTION OF THE DRAWING FIGURES.

DETAILED DESCRIPTION OF THE INVENTION

Figure 1:
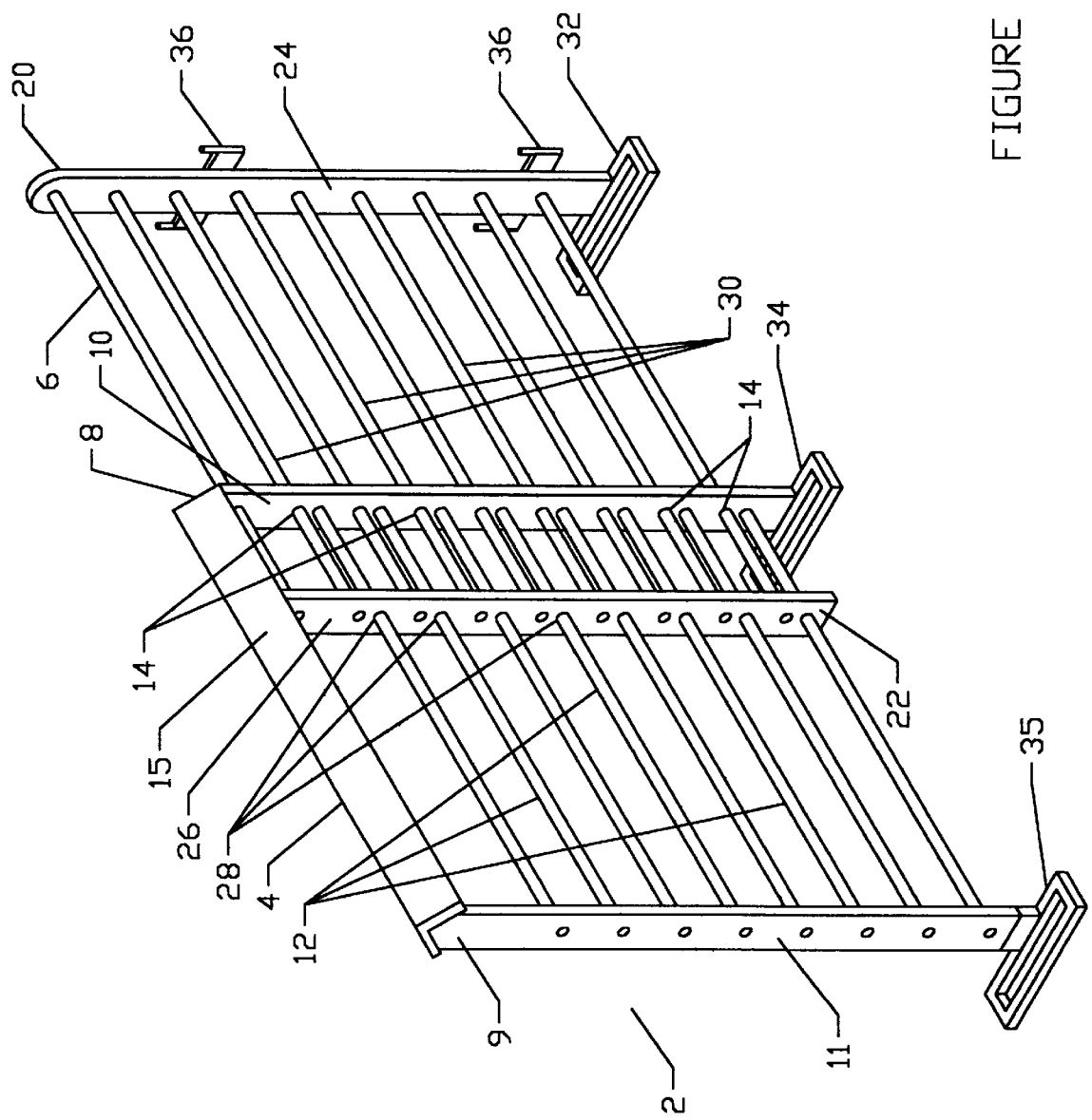
FIG. 1 is a front perspective of the gate invention with the adjustable member shown in the extended position.

A fencing unit or "gate" for use in a hog confinement facility is disclosed in FIG. 1 wherein a stationary section 4 of invention gate 2 is provided with a first end 8 and a second end 9, each of which is provided with a vertical end plate 10 and 11 respectively, which secures the transverse members 12 which comprise the lateral fencing members. Typical gates are provided with a multiplicity of generally thin transverse members 12, typically six, and are elongate rods in the preferred embodiment. The transverse members 12 are mounted in parallel relation to top rail 15 and extend from first end plate 10 to second end plate 11. The transverse members 12 are fixed at their opposing ends to the end plates 10 and 11. The first end plate 10 of stationary member 4 may be provided with typical mounting hardware as in prior art devices to allow it to be secured to a coaxial adjacent gate or alternatively to be mounted detachably to a neighboring perpendicularly extending gate.

First end plate 10 of invention gate 2 is provided with a plurality of rod receiving elements which in the preferred embodiment comprise openings 14 in first end plate 10 which are spaced to receive the rods 12 of adjustable member 6 of invention gate 2. Adjustable member 6 is provided with first end 20 and second end 22, each of which is provided with a vertical end plate 24, 26 respectively. End plate 26 of second end 22 of adjustable member 6 is provided with openings 28 therethrough in which are received the rods 12 of stationary member 4 of gate 2 such that end plate 26 may be slid along rods 12 of stationary member 4 and such that rods 30 of adjustable member 6 of gate 2 may slide through the receiving openings 14 of end plate 10 of first end 8 of stationary member 4. End plate 10 of stationary member 4 is provided with a foot 34 which supports the end 8 of stationary member 4. Similarly second end of stationary member 4 is provided similarly with foot 35. It is intended that feet 34 and 35 be secured to the floor of the confinement building.

First end 20 of adjustable member 6 is provided with a foot 32 while lateral rods 30 of adjustable member 6 are supported by end plate 10 of first end 8 of stationary member 4 of gate 2.

When invention gate 2 is used as a lateral pen wall and extends toward a central alley from the outside wall of a hog confinement building, the end plate 24 of first end 20 of adjustable member 6 is used to retain end walls of the pens which define the alley of the hog confinement facility. Mounting hooks 36 which are well known may be used to secure perpendicularly extending prior art gate members to end plate 24 of first end 20. Because adjustable member 6 of invention gate 2 may be telescoped inwardly upon stationary member 4, it can be understood that when desired, the alley of the facility may be widened by sliding all lateral gate walls toward the outside walls of the facility. The end walls of the pens along the alley need not be disconnected from the end plates 24 of first ends 20 of the adjustable members 6 of the invention gates 2 but are slid along the flooring of the facility as the adjustable members 6 of the invention gates 2 are telescoped toward the stationary members 4 thereof.

Figure 2:
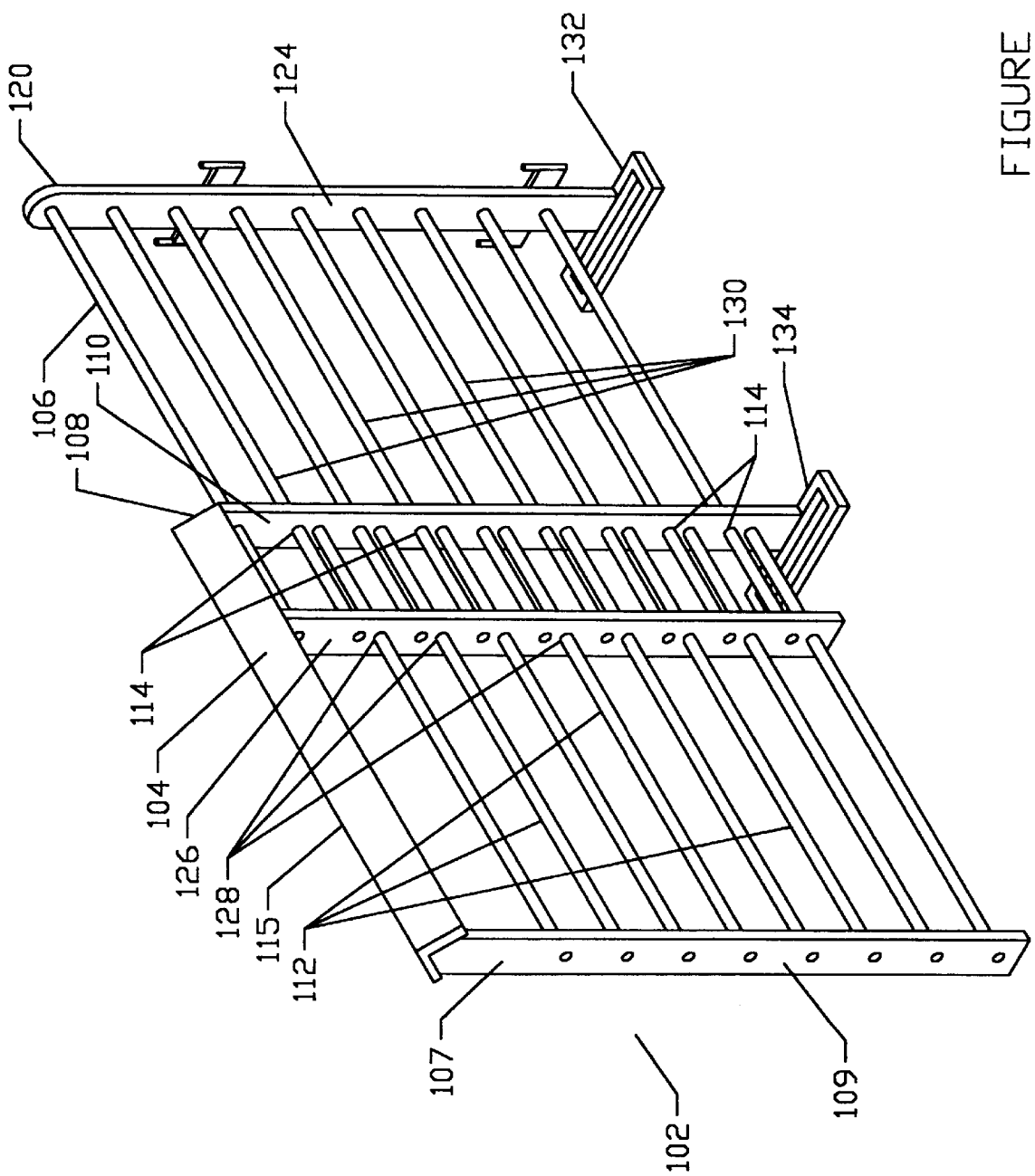
FIG. 2 is a front perspective of an alternate embodiment of the gate invention useful for modification of a prior art gate into an adjustable length gate.

An alternate embodiment is shown in FIG. 2 wherein a gate panel 102 is disclosed to be used for modification of existing fixed length gates used as lateral pen walls in a confinement facility. The alternate embodiment gate 102 comprises a stationary member 104 and a sliding member 106, the stationary member 104 having end plates 110 and 109 and the sliding member 106 having opposing end plates 124 and 126. End plate 110 of first end 108 of stationary member 104 is provided with openings 114 which are spaced to align with rods 130 of sliding member 106. End plate 126 of sliding member 106 is provided with opening 128 therethrough into which rods 112 of stationary member 104 are received. A top rail 115 of angular cross section is provided for stability of stationary member 104, said top rail 115, along with rods 112, interconnecting end plates 110 and 109. Likewise end plates 124 and 126 of sliding member 106 are interconnected by lateral rods 130. End plate 110 of stationary member 104 is provided with foot member 134 which is fixed to the slotted floor of the confinement building. End plate 124 of sliding member 106 is also supported by a foot 132 which is free upon the floor. End plate 109 of first end 107 of stationary member is not provided with a foot, it to be understood that the end plate 109 of first end 107 of stationary member 104 can be bolted, welded, or equivalently secured to an existing gate to provide an adjusting accessory axially mounted to an existing gate. If necessary, an existing gate may be shortened by cutting off an end section and substituting alternate embodiment 102 in its place, resulting in a gate of adjustable length.

Figure 3:
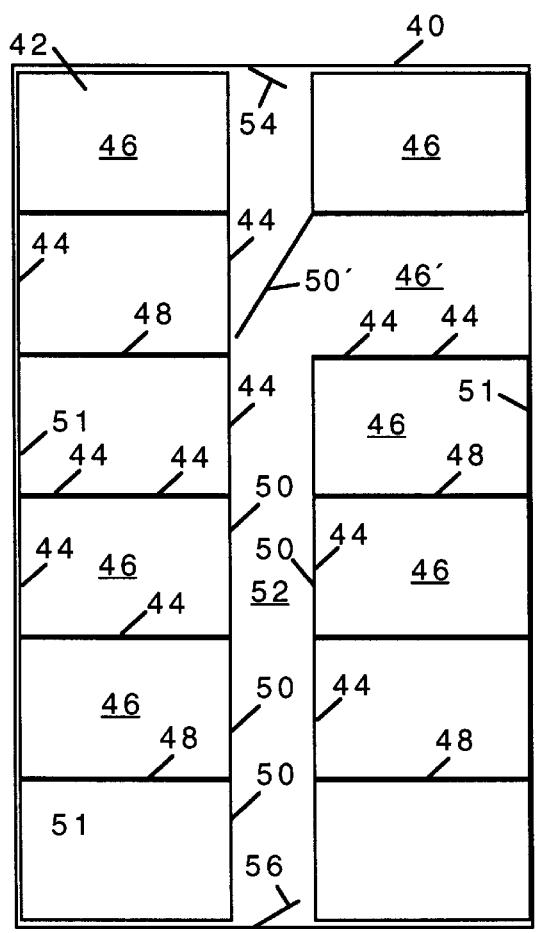
FIG. 3 is a overhead view of a hog confinement building equipped with prior art fixed length gates defining pens within the building and showing a central alley between two opposing series of pens with one end panel gate swung open into the central alley.

FIG. 3 is an overhead view of the inside of a prior art hog confinement facility. The facility comprises a building 40 having a slotted floor 42 in which a plurality of fixed length gate members 44 have been arranged to form a multiplicity of pens 46 by interconnecting some of the prior art gate members 44 end to end for the lateral walls 48 of pens 46, and the gate members 44 are connected in perpendicular selectively detachable arrangements to end walls 50, 51 of pens 46. Central end walls 50, when connected at their ends to lateral pen walls 48, define an alley 52 from end to end of the building 40 leading to doors 54, 56 in opposing building end walls 58, 60. Alley 52 is of fixed width, usually twenty-four inches, to allow persons to pass therealong, and also to allow hogs to move along alley 52 in single file when a central end wall 50, such as central end wall 50' of pen 46' is opened.

Figure 4:
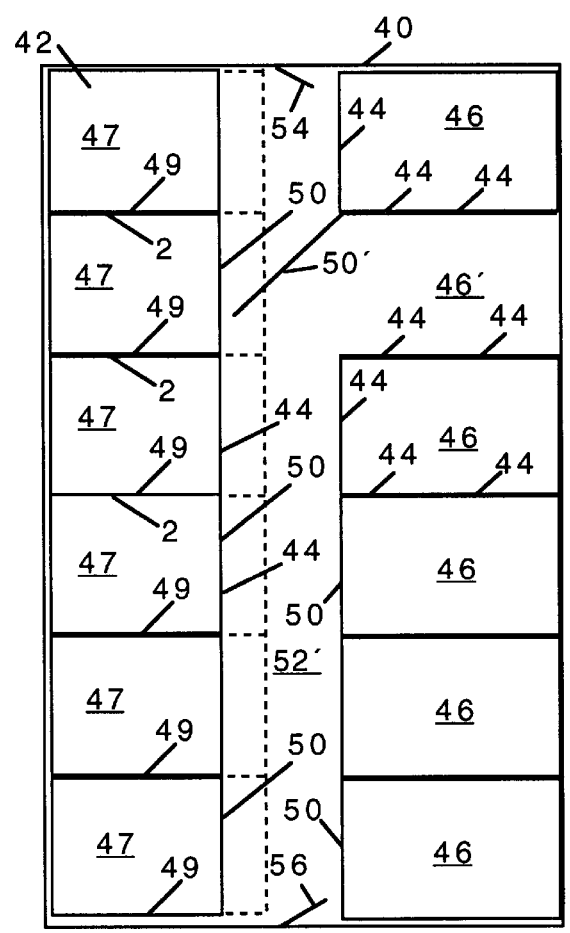
FIG. 4 is a overhead view of a hog confinement building equipped with the invention gates employed in one series of pens shown in their retracted position providing an increased alley width and showing in phantom the expanded pens with the invention gates shown in extended position resulting in a narrowed alley. One of the pen end panel gates is shown opened into the expanded central alley.

FIG. 4 illustrates the top view of an improved confinement system of pen gates utilizing the invention gates 2. Pens 46 on the right hand side of building 40 (as shown in FIG. 4) are defined by a set of orthogonally arranged prior art fixed length gate members 44. On the left hand side of building 40 are a plurality of side-by-side pens 47, the extendable invention gates 2 shown being employed as lateral pen wall elements 49 of pens 47. Lateral pen wall elements 49 are shown in the retracted position with prior art gates 44 in use as central end walls 50 of pens 47. The extended position for lateral walls 49 and central end walls 50 is shown in phantom in FIG. 4. With lateral members 49 in the retracted position, an enlarged width alley 52' is selectively provided to allow hogs leaving pen 46' to proceed along alley 52'. When the need to use alley 52' for moving hogs ends, lateral wall members 49 may be extended to return alley 52' to a narrow width, thereby enlarging pens 47 to accommodate more hogs in the confinement building 40.

Having described the invention, I claim:

1. An extendible hog gate for use as a sidewall of a hog containment pen in a confinement building, comprising a first section and a second section longitudinally slidable upon the first section, said first section having a first end and an opposing second end and having a multiplicity of generally horizontal elongate members mounted between said first end and said second end, each of said ends of said first section having a base member at the lower extremity thereof, said second section having a first end and an opposing second end, said second end of said second section engageable with said first section, said first end of said second section having a base member at the lower extremity thereof, said second section comprising a multiplicity of generally horizontal generally parallel elongate linear members between said first end and said second end, each of said first end and said second end of said first section has an upstanding end plate thereon, each of said first end and said second end of said second section has an upstanding end plate thereon, each of said elongate linear members of said first section has opposing ends fixed to said end plates of said first section, each of said elongate linear members of said second section has opposing ends fixed to said end plates of said second section, said end plate of said second end of said first section has a multiplicity of receiving elements thereon corresponding to the number and position of said elongate linear members of said second section, said end plate of said second end of said second section has a multiplicity of receiving elements thereon corresponding to the number and position of said elongate linear members of said first section, each of said linear members is receivable within a corresponding retaining element, each of said linear members is axially movable within said corresponding receiving elements.

2. The gate of claim 1 wherein each of said base members comprises a plate mounted transversely to said end plate.

3. The apparatus of claim 2 wherein said elongate linear members comprise thin bars, said receiving elements of said end plates comprise openings through said end plates.

4. The apparatus of claim 3 wherein said first section is provided with a top linear element interconnecting said first end and said second end thereof, said top linear element is an L-shaped bar.

5. Apparatus for attachment to a fixed length linear hog gate having an upstanding end plate on an end thereof, comprising a stationary member and a longitudinally extending adjustable member slidable upon said stationary member, the stationary member having a first end and an opposing second end, the first end of said stationary member having a vertical end plate, the second end of said stationary member having a vertical end plate, the adjustable member having a first end and an opposing second end with a multiplicity of elongate bar members disposed therebetween, the second end of said adjustable member having a vertical end plate fixed to each of said elongate bar members of said adjustable member, said end plate of said second end of said stationary member having a multiplicity of bar retaining elements, said bar retaining elements of said end plate of said second end of said stationary member receiving said elongate bar members of said adjustable member, said end plate of said first end of said stationary member mountable to the end plate of said linear fixed length hog gate.

6. The apparatus of claim 5 wherein said stationary member has a multiplicity of elongate bar members disposed between said first and second ends thereof, said vertical end plate of said second end of said stationary member is fixed to each of said elongate bar members of said stationary member, said end plate of said second end of said adjustable member has a multiplicity of bar retaining elements, said bar retaining elements of said end plate of said second end of said adjustable member receive said elongate bar members of said stationary member.

7. The apparatus of claim 6 wherein said second end of said stationary member is provided with a foot element, said first end of said adjustable member is provided with a foot element.

8. The apparatus of claim 7 wherein said bar retaining elements of said end plate of said second end of said stationary member comprise openings through said end plate, said bar retaining elements of said end plate of said second end of said adjustable member comprising openings through said end plate.

9. The apparatus of claim 8 wherein said adjustable member is coaxial with said stationary member.

10. The apparatus of claim 9 wherein said foot elements of said stationary member and said adjustable member comprise transverse plates mounted to said the end plates of said stationary member and said adjustable member.

11. An improved system of pens for a livestock confinement facility having a rectangular floor and having centrally located doors on opposing sides thereof, comprising a multiplicity of pens arranged in two series on opposing sides of said facility, said series defining a central alley therebetween, each of said pens comprising a plurality of discrete fence members detachably fastened at the respective ends thereof to define a rectangular space therewithin, each of said pens comprising a pair of opposing longer walls and a pair of opposing shorter walls, said opposing longer walls disposed perpendicularly to said central alley, each of said shorter walls comprising a gate having opposing ends separated by a plurality of horizontal members, each of the longer walls of the pens of the first of said two series of pens comprising a telescopingly adjustable fencing unit, whereby said longer walls may be adjusted in length to selectively increase or decrease the width of said central alley.

12. The system of claim 11 wherein each of said longer walls may be shortened by a single user without using tools.

13. The system of claim 11 wherein each of said longer walls comprises a first section and a second section, said second section is slidably adjustable upon said first section to vary the length of said fencing unit.

14. The system of claim 11 wherein each of said longer walls comprises a first section and a second section, each of said first section and said second section has a plurality of horizontal thin bar members fixed between opposing ends thereof, the bar members of said second section are retained to a first of the opposing ends of said first section and are slidable thereupon.

15. The system of claim 14 wherein the bar members of said first section are retained to a first of the opposing ends of said second section and are slidable thereupon.

16. The system of claim 15 wherein said first section comprises a first end and an opposing second end, each of said ends of said first section has an upstanding end plate thereon, said second section comprises a first end and an opposing second end, each of said ends of said second section has an upstanding end plate thereon, the end plate of said second end of said first section has a multiplicity of receiving elements thereon corresponding to the number and position of said bar members of said second section, the end plate of said second end of said second section has a multiplicity of receiving elements thereon corresponding to the number and position of said bar members of said first section, each of said bar members receivable within a corresponding retaining element, each of said bar members axially movable within said corresponding receiving elements.

17. The system of claim 16 wherein said retaining elements of second first and second section comprise openings in said corresponding end plates, said first and second section are axially aligned.

18. The system of claim 17 wherein each of said end plates of said first section has a lower end with a base member thereon, said end plate of said first end of said second section has a lower end with a base member thereon.

* * * * *